United States Patent
Saika

(10) Patent No.: US 7,100,007 B2
(45) Date of Patent: Aug. 29, 2006

(54) BACKUP SYSTEM AND METHOD BASED ON DATA CHARACTERISTICS

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 10/794,241

(22) Filed: Mar. 5, 2004

(65) Prior Publication Data

US 2005/0060356 A1 Mar. 17, 2005

(30) Foreign Application Priority Data

Sep. 12, 2003 (JP) ............................. 2003-320771

(51) Int. Cl.
*G06F 12/16* (2006.01)
(52) U.S. Cl. .............................. 711/162; 714/5; 714/6; 709/218
(58) Field of Classification Search ...................... None
See application file for complete search history.

(56) References Cited

U.S. PATENT DOCUMENTS 6,286,085 B1 * 9/2001 Jouenne et al. ............. 711/162
6,850,958 B1   2/2005 Wakabayashi
2002/0083085 A1 * 6/2002 Davis et al. ................. 707/204
2002/0184559 A1  12/2002 Qin et al.
2003/0126247 A1 * 7/2003 Strasser et al. ............. 709/223
2004/0034672 A1   2/2004 Inagaki
2005/0125467 A1   6/2005 Oosaki et al.

FOREIGN PATENT DOCUMENTS

JP 2002-215474 8/2002

* cited by examiner

*Primary Examiner*—B. James Peikari
(74) *Attorney, Agent, or Firm*—Townsend and Townsend and Crew LLP

(57) ABSTRACT

The present invention permits backup processing suited to data characteristics relating to backup target data by means of a method that is simple for the user. Data characteristic classification definition information, in which data characteristic IDs correspond with one or more data characteristic types respectively, and mapping information, in which backup destination server information corresponds with one or more data characteristic IDs respectively, are prepared. The backup source server 3 sets data characteristic IDs in each of the backup target files on the basis of metadata of designated backup target files and of the data characteristic classification definition information, and then determines backup destination servers 6A to 6C for each of the backup target files on the basis of the set data characteristic IDs and mapping information and transmits the backup target files to the determined servers 6A to 6C.

11 Claims, 16 Drawing Sheets

FIG. 3

| | |
|---|---|
| ID-001 | (FILE ENCRYPTION=PRESENT OR (FILE ENCRYPTION=ABSENT) AND<br>KEYWORD IN TEXT=* * *)) AND<br>ACL SETTING PRESENT   AND<br>COMMON USER POST=AAA, 80% OR MORE AND<br>ACCESS-ENABLED USER GROUP={XXXX OR YYYY OR ZZZZZ} |
| ID-002 | FILE ENCRYPTION=ABSENT AND<br>ACL SETTING=ABSENT AND<br>ACCESS ENABLED USER GROUP: NO RESTRICTIONS AND<br>FILE EXTENSION= {.html, .doc, .xls} |

FIG. 4

| FILE NAME (PATH NAME) | CHARACTERISTIC ID |
|---|---|
| /.../home/user001/a.txt | ID-100 |
| /.../home/user002/b.txt | ID-100 |
| /.../home/confidential/c.txt | ID-101 |
| /.../home/user003/d.txt | ID-102 |
| /.../home/user003/k.sys | ID-103 |
| /.../home/user004/y.html | ID-110 |
| ⋮ | |
| /.../home/user999/xx.doc | Default(DOES NOT APPLY TO DEFINED RULES) |

| CHARACTERISTIC ID | HOST NAME |
|---|---|
| ID-001 | host-a |
| ID-002 | host-b |
| ⋮ | ⋮ |
| Default | host-c |

FIG. 15

| HOST NAME | BACKUP DISCRIMINATION INFORMATION |
|-----------|-----------------------------------|
| host-a | X1XXXXXXX |
| host-b | X2XXXXXXX |
| ⋮ | ⋮ |
| host-c | XZXXXXXXX |

D30

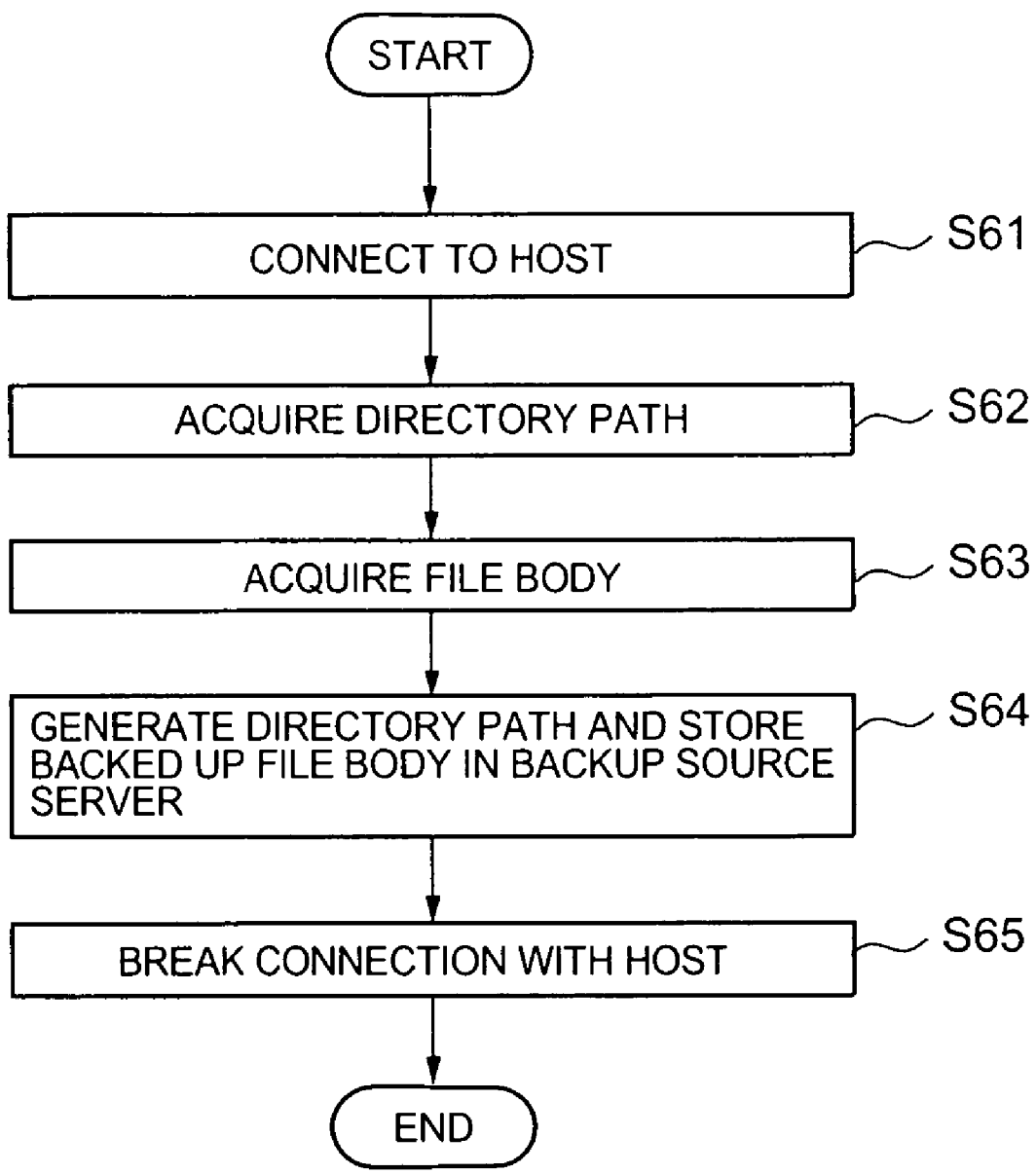

BACKUP SYSTEM AND METHOD BASED ON DATA CHARACTERISTICS

CROSS-REFERENCES TO RELATED APPLICATIONS

This application relates to and claims priority from Japanese Patent Application No. 2003-320771 filed on Sep. 12, 2003, the entire disclosure of which is incorporated herein by reference.

BACKGROUND OF THE INVENTION

1. Field of the Invention

The present invention relates to a technology for backing up data, and, more specifically, to a technology for backing up data to at least one device among a plurality of backup destination devices via a communication network, for example.

2. Description of the Related Art

Conventionally known backup systems are systems in which a plurality of backup destination servers exist in a communication network such as the Internet, and at least one backup destination server is selected from this plurality of backup destination servers, and data is backed up by transferring data to the backup destination servers. In such a system, according to Japanese Patent Publication Laid Open No. 2002-215474, for example, a backup destination server constituting a destination for storing data to be backed up (hereinafter "backup target data") is selected from among the plurality of backup destination servers on the basis of the reliability, performance, or processing speed of the plurality of backup destination servers, and then backup processing is performed by transferring backup target data to the selected backup destination server.

However, with the above-mentioned conventional backup systems, the data characteristics relating to the backup target data are not considered when a backup is made. A variety of types of backup target data may be considered to exist for the user. For example, if there is also backup target data that needs to undergo backup processing distinctly from other data, there is probably also backup target data that needs to undergo backup processing with an emphasis on security and backup target data for which reliability must be secured as in the case of a backup to a plurality of locations may also be considered to exist.

In order to perform a backup in which the data characteristics of such backup target data are considered, settings with respect to how the backup processing is performed may be considered one at a time. However, the setting of backup processing in such small units is a tedious operation and troublesome for the user.

Accordingly, it is a feature of the present invention to make it possible to perform backup processing that is suited to the data characteristics pertaining to the backup target data by means of a method that is straightforward for the user.

BRIEF SUMMARY OF THE INVENTION

The backup system according to one aspect of the present invention comprises: a backup source computer device that stores backup target data; a plurality of backup destination computer devices each connected to the backup source computer device via a network; a backup mode selector that selects, according to data characteristics of the backup target data, any one backup mode from among a plurality of pre-prepared backup modes; and a backup executor that stores the backup target data by transferring same from the backup source computer device to a backup destination computer device that is selected on the basis of the selected backup mode from among the backup destination computer devices.

The backup source computer device and the backup destination computer device may be constituted as a computer system that is capable of using storage devices such as hard disk or semiconductor memory device, as in the case of a file server (NAS (Network Attached Storage)) or similar, for example. The backup source computer device can comprise a file system that is shared by a plurality of users, for example. Examples of backup target data may include data files created by each user, data groups constituting the content of a database, and system files defining the constitution and the like of the user system, and so forth. With this embodiment, backups are performed in file units. Data characteristics can be defined as information denoting the data usage characteristics possessed by the backup target data, for example, and can be classified in accordance with the purpose for using the backup target data, and the form of usage.

According to an embodiment of the present invention, backup modes are prepared in accordance with predefined plural-type data characteristics. When a backup instruction is issued by the operations manager or similar, or a preset backup time arrives, the backup mode selector discriminates data characteristics of the backup target data and select a backup mode that matches the data characteristics. A backup destination computer device that is used as the backup destination of the backup target data is determined by the selection of the backup mode. The backup executor transfers the backup target data to the selected backup destination computer device. The backup target data is accordingly prepared for the backup destination computer device. Methods for transferring backup target data can be broadly classified into two types. One method is a method that transmits backup target data from a backup source computer device to a backup destination computer device. The other method is one in which the backup destination computer device accesses the backup source computer device to download backup target data.

According to an embodiment of the present invention, the backup mode selector determines whether the backup target data possesses any data characteristic on the basis of pre-prepared characteristic classification conditions.

Characteristic classification conditions are discrimination information serving to discriminate whether the backup target data pertains to any of the predefined plural-type data characteristics. Here, data characteristics that are pre-classified by the characteristic classification conditions can be expressed as defined data characteristics, data characteristic types, data characteristic categories, and so forth, for example.

According to an embodiment of the present invention, the backup mode selector determines whether the backup target data possesses any data characteristics by comparing acquired metadata relating to the backup target data, and characteristic classification conditions.

Examples of acquired metadata relating to the backup target data include, for example, a file name, file size, an update date and time, a file extension (that is, the file type), access group management information set in a file, names of the users sharing the file, the total number of common users, and the category to which the common users belong (job categories such as the planning department, accounting department, development department, as well as ranking categories such as person in charge, section manager, head of department, and executive, for example), and so forth.

Data characteristics include any one of data characteristics that prioritize the securing of data reliability or data characteristics that prioritize the securing of data security.

According to an embodiment of the present invention, both data characteristics that place emphasis on data reliability and data characteristics that place emphasis on data security are included.

Data characteristics that prioritize the securing of data reliability are a data characteristic segment in which data consistency is secured and the prevention of data destruction and loss is required. The data characteristics that prioritize the securing of data reliability can be determined by considering at least one or more judgment elements among judgment elements such as the number of common users, file extension type, file name, and the presence or absence of write permissions, for example.

The data characteristics that prioritize the securing of data security are a data characteristic segment in which data secrecy is retained and the prevention of unauthorized copying and so forth is required. Data characteristics that prioritize the securing of data security can be determined by considering at least one or more judgment elements among judgment elements such as the presence or absence of encryption, the number of common users, special features common to common users, the presence or absence of access restrictions, file extension type, file name, and the presence or absence of predetermined keywords, for example.

According to an embodiment of the present invention, the backup executor selects a backup destination computer device constituting a backup destination on the basis of backup destination mapping information constituted so as to pre-match at least one or more backup destination computer devices of the backup destination computer devices with each backup mode.

According to an embodiment of the present invention, the backup executor comprises: a backup list generator that generates a backup list that includes information specifying backup target data to be acquired by the backup destination computer device; and a backup list transmitter that transmits the backup list to the backup destination computer device, and wherein the backup destination computer device comprises: a data acquisitor that stores backup target data by acquiring same from the backup source computer device on the basis of the backup list received from the backup source computer device.

Here, examples of information specifying the backup target data include information on the path to the backup target data, the file name, and so forth. The backup list is prepared for each of the backup destination computer devices and each of the backup target data items to be acquired by each backup destination computer device is explicit in each backup list. Accordingly, the backup destination computer device is able to specify backup target data to be acquired, and acquire backup target data from the backup source computer device by referencing only the backup list that is addressed to the backup destination computer device.

According to an embodiment of the present invention, the backup list includes information indicating a backup availability time when backup target data can be acquired from the backup source computer device, and the backup destination computer device accesses the backup source computer device according to the backup availability time to acquire the backup target data.

By including a backup availability time in the backup list, the reading of backup target data at a time other than the backup availability time can be prevented beforehand, and hence stability can be raised.

According to an embodiment of the present invention, upon receiving the backup list from the backup source computer device, the backup destination computer device generates restore data to be used for restoring the backup target data, and transmits the restore data thus generated to the backup source computer device.

For example, the restore data can include discrimination information for specifying data (or a data group) that is backed up to the backup destination computer device.

According to an embodiment of the present invention, the backup list transmitter controls the time for transmitting the backup list to the backup destination computer device.

For example, as a result of a shift between the backup availability time that is granted one backup destination computer device and a backup availability time that is granted another backup destination computer device, the time of the backup processing by each backup destination computer device can be adjusted and the processing load on the backup source computer device and the communication network traffic can be controlled.

A backup method according to another aspect of the present invention for performing a backup between a backup source computer device for storing backup target data and a plurality of backup destination computer devices each connected to the backup source computer device via a network, comprises the steps of: determining data characteristics pertaining to backup target data on the basis of characteristic classification conditions for classifying data characteristics; determining a backup destination computer device for each of the backup target data on the basis of the determined data characteristics and of backup destination mapping information that is constituted so that at least one or more of the backup destination computer devices constituting backup destinations correspond(s) with each of the data characteristics; collecting, for each of the backup destination computer devices, the backup target data corresponding with the backup destination computer devices; generating, for each of the backup destination computer devices, a backup list that includes information specifying backup target data to be acquired by the backup destination computer devices; transmitting the generated backup lists to the backup destination computer devices; and transferring the backup target data from the backup source computer device to the backup destination computer devices on the basis of the basis of the received backup lists.

A computer device according to yet another aspect of the present invention, comprising: a component that stores characteristic classification conditions for classifying data characteristics; a component that determines data characteristics pertaining to backup target data on the basis of the characteristic classification conditions; a component that stores backup destination mapping information constituted such that at least one or more backup destination computer devices constituting a backup destination correspond(s) with each of the data characteristics; a component that determines a backup destination computer device for each of the backup target data on the basis of the determined data characteristics and the backup destination mapping information; a component that that collects, for each of the backup destination computer devices, the backup target data corresponding with the backup destination computer devices and generating, for each of the backup destination computer devices, a backup list including information specifying backup target data to be acquired by the backup destination computer devices; a component that transmits the generated backup lists to the backup destination computer devices; and a component that transfers the backup target data to the backup destination computer devices when the backup destination computer devices request the acquisition of backup target data on the basis of the transmitted backup lists.

The computer program according to another aspect of the present invention is a computer program that causes a computer device for storing backup target data to execute a method for issuing a backup request, the backup method comprising the steps of: determining data characteristics pertaining to backup target data on the basis of characteristic classification conditions for classifying data characteristics; determining a backup destination computer device for each of the backup target data on the basis of the determined data characteristics and of backup destination mapping information that is constituted so that at least one or more of the backup destination computer devices constituting backup destinations correspond(s) with each of the data characteristics; generating, for each of the backup destination computer devices, a backup list that includes information specifying backup target data to be acquired by the backup destination computer devices; and transmitting the generated backup lists to the backup destination computer devices.

BRIEF DESCRIPTION OF THE DRAWINGS

FIG. 3 shows an example of data characteristic classification definition information.

FIG. 4 shows an example of classification result data.

FIG. 5 shows an example of backup destination mapping information.

FIG. 15 shows an example of a restore file.

FIG. 16 shows the flow of the restore processing of the backup source server 3.

DETAILED DESCRIPTION OF THE INVENTION

An embodiment of the present invention will be described hereinbelow with reference to the drawings.

Figure 1:
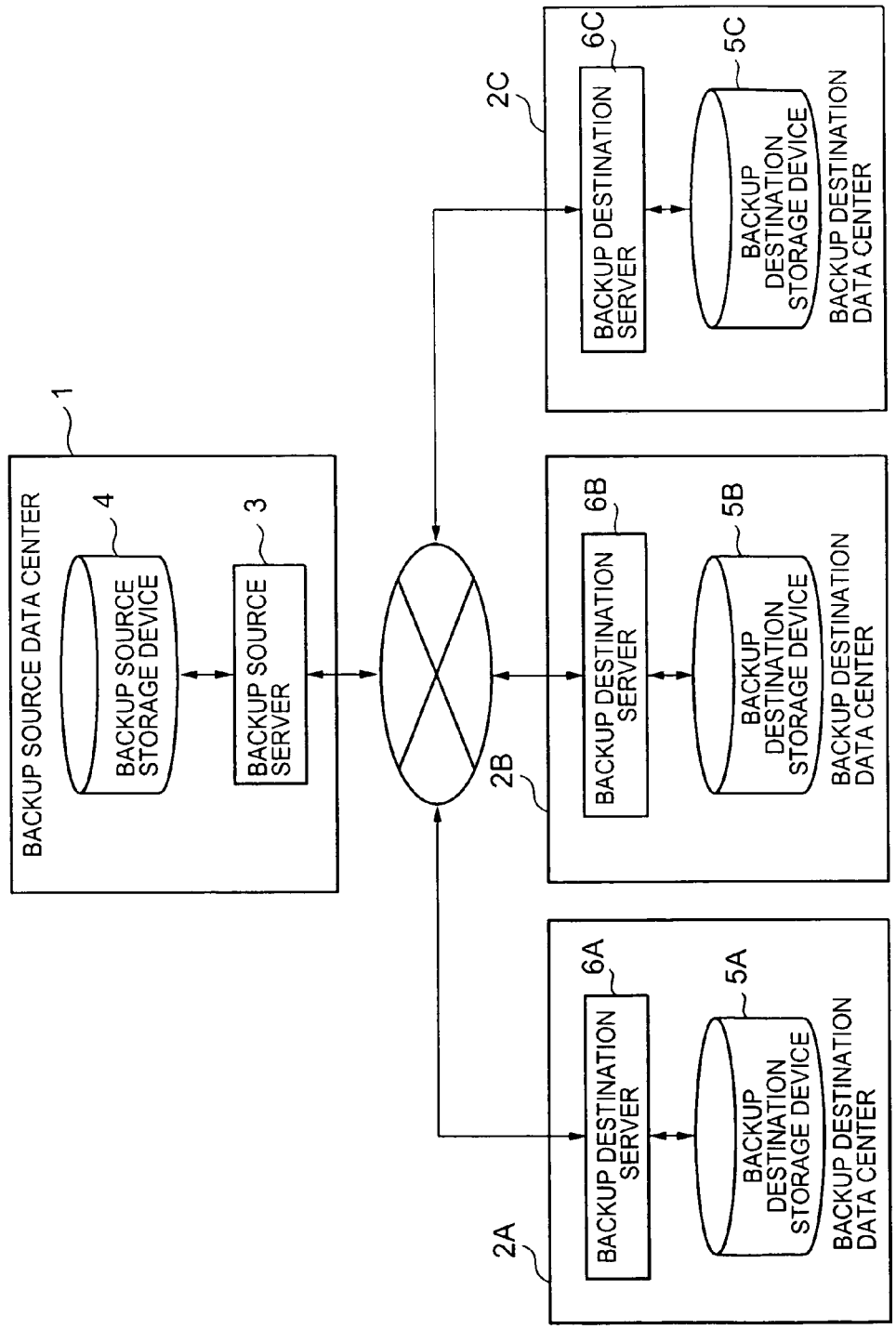
FIG. 1 is an overall constitutional view of the backup system according to an embodiment of the present invention.

FIG. 1 is an overall constitutional view of the backup system according to an embodiment of the present invention.

As shown in FIG. 1, the backup system according to this embodiment has a single backup source data center 1 (or a plurality thereof), and a plurality (three, for example) of backup destination data centers (2A, 2B, 2C).

The backup source data center 1 is a data center constituting the backup source of backup target files. The center 1 comprises one or a plurality of backup source storage devices 4 that store backup target files, and a backup source storage device 3, which can be communicably connected to the backup source storage devices 4 via a communication network or the like such as an SAN (Storage Area Network).

Meanwhile, the backup destination data centers (2A, 2B, and 2C) are data centers for storing backups of files that are stored in the backup source data center 1. For example, the center 2A comprises one or a plurality of backup destination storage devices 5A, which are capable of storing backups of backup target files; and a backup destination server 6A that can be communicably connected to the backup destination storage devices 5 via a communication network or the like such as an SAN. As is shown, another center 2B (and 2C) also comprises a storage device 5B (and 5C) like the center 2A, and a server 6B (and 6C).

The servers 3 and 6A to 6C, and the storage devices 4 and 5A to 5C will be described below.

The backup source server 3 classifies one or a plurality of backup target files in the backup source storage device 4 into one or more file groups (groups including one or more backup target files) that have common data characteristics on the basis of respective data characteristics for these backup target files. Further, the backup source server 3 transmits one or more backup target files pertaining to each file group to one or more backup destination servers 6A to 6C on the basis of common data characteristics in these file groups.

The backup source storage device 4 is a storage system that comprises an external or internal hard disk, or one or a plurality of hard disks in the form of an array, for example, and is able to store backup target files. In the backup source storage device 4, various files are of a predetermined format and are managed according to a hierarchical structure in which, for example, a second directory lies below a first directory and one or a plurality of files are stored in the second directory. Therefore, if, for example, the operator designates the first directory as the backup target with respect to the backup source server 3, all the directories and files that lie below the first directory are designated as the backup target.

The backup destination servers 6A to 6C receive backup target files from the backup source server 3 and store these backup target files in the communicably connected backup destination storage devices 5A to 5C respectively.

The backup destination storage devices 5A to 5C are storage devices in which backup target files are stored via the backup destination servers 6A to 6C from the backup source server 3, and are magnetic tape libraries equipped with one or a plurality of magnetic tapes, or storage systems comprising one or a plurality of hard disks in the form of an array, for example.

Figure 2:
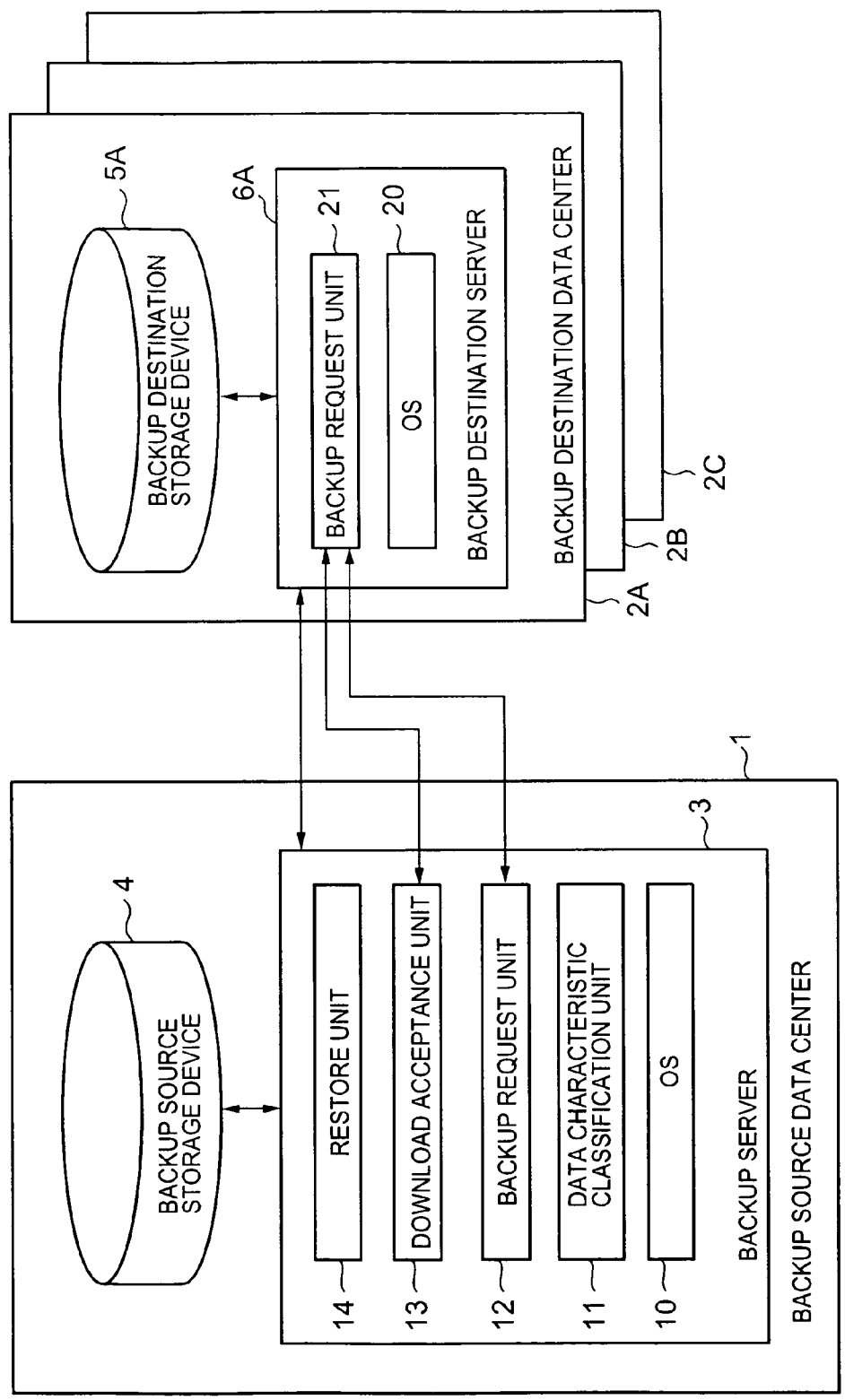
FIG. 2 is a block diagram showing the functions of the servers 3 and 6A to 6C that constitute the backup system according to this embodiment.

FIG. 2 is a block diagram showing the functions of the servers 3 and 6A to 6C that constitute the backup system according to this embodiment.

The backup source server 3 comprises an operating system (OS) 10 such as a Microsoft Windows (Trademark) operating system, and comprises, as application software above this OS 10, a data characteristic classification unit 11, a backup request unit 12, a download acceptance unit 13, and a restore unit 14.

When a backup target is designated from outside the backup source server 3 (an operator or a remote external device, for example), the data characteristic classification unit 11 acquires, with predetermined timing (immediately following the designation of the backup target or at fixed intervals, for example), metadata for the designated backup target file (and/or metadata for one or more directories containing the file) from the backup source storage device 4. The data characteristic classification unit 11 then classifies the designated backup target file on the basis of the acquired meta data and pre-prepared data characteristic classification definition information.

Here, the file (and 'directory') 'metadata' represents characteristics relating to the file (and directory) and includes at least one type of information among the following subinformation in (1) to (7) below, for example:
(1) the number of common users (the number of users allowed to access the file (and directory) and view same);
(2) extension (such as 'jpg' or 'gif', for example);
(3) keyword (character or character string contained in the file name, directory name and/or actual data, for example);
(4) presence or absence of write permissions (whether or not writing is permitted);
(5) encryption attribute (information indicating whether the file (and directory) is encrypted);
(6) presence or absence of ACL(Access Control List) settings (whether there is corresponding information (that is, an ACL) indicating which users or user groups can gain access and the manner in which they do so (reading, writing, or execution, for example)); and
(7) special characteristics of common users (common user posts or departments, for example) (may be another type of information (such as message data, for example) relating to access restrictions instead of the ACL of the 'presence or absence of ACL settings' in (6), for example).

Further, data characteristic classification definition information is information relating to rules on how backup target files are classified, and is created by a predetermined individual (an operations manager, for example) and then stored in a predetermined location on a communication network (in the backup source server 3 or backup source storage device 4, for example). More specifically, as shown in FIG. 3, for example, data characteristic classification definition information includes one or more data characteristic IDs for discriminating one or more data characteristic types and one or more rule bodies that correspond with the one or more data characteristic IDs. The rule body is information representing conditions for assigning the corresponding data characteristic IDs (in other words, information representing the data characteristic type corresponding with the data characteristic ID). Each rule body has a predetermined constitution, comprising a plurality of subconditions and logic operators that link the subconditions, for example (AND, OR, XOR, and so forth, for example). In FIG. 3, for example, in the case of the rule body for the data characteristic 'ID-002', the file is not encrypted, and there is no ACL setting and no restrictions relating to access-enabled user groups (that is, common users are not set), and the rule body shows that the file extension is '.html', '.doc', or '.xls'. If a file corresponding to the conditions indicated by this rule body (a file with metadata or actual data satisfying the conditions of the rule body, for example) exists, the data characteristic ID 'ID-002' is assigned to this file.

The individual creating the data characteristic classification definition information (hereinafter called the 'creator') is not limited to the example shown in FIG. 3, and is able to create a variety of rule bodies by preparing subconditions of any kind and connecting any of the prepared plurality of subconditions in some way.

For example, when a file classification with an emphasis on file (or directory) reliability is desired of the data characteristic classification unit 11, a rule body can be created on the basis of at least one aspect of the following aspects (A) to (C), for example.

(A) Subconditions based on the number of common users are prepared, and the data characteristic classification unit 11 is thus made to perform file classification on the basis of the number of common users. For example, a file (or directory) for which the number of common users is at or more than a certain value can be judged as being a file for which reliability is emphasized in that it is thought that the number of accessing users is large (or the access frequency is high) and hence the effects of file deterioration are large. For this reason, the creator may set a desired value for the "number of common users" as a subcondition in the rule body, and, by means of processing by the data characteristic classification unit 11 (described in detail subsequently), a data characteristic ID indicating that the file reliability is high is assigned to a certain file (or directory) the number of common users of which is equal to or more than the desired value.

(B) Subconditions based on an extension or keyword (character string contained in metadata or actual data, for example) are prepared, and the data characteristic classification unit 11 is thus made to perform file classification on the basis of an extension or a character string that is contained in the file name. For example, when the extension is '.sys', it can be judged that this is data for which reliability is emphasized in that, when a definition file relating to the constitution of a server program, or the like, has been stored and the file content is then changed or destroyed, the server no longer operates correctly and so forth, this being the cause of a fatal error. On the other hand, for example, because a temporary file (extension 'tmp'), or a work directory (extension 'wrk') that is temporarily created is temporary data, a backup is not required, and a judgment to remove this data from backup processing is possible. As a result, the creator may set 'extension' or 'keyword' as a subcondition within the rule body as a condition to be selected during classification, or may set 'extension' or 'keyword' as a condition to be excluded from the backup target during classification, whereby file classification based on file reliability is performed by the processing of the data characteristic classification unit 11 (described in detail subsequently).

(C) Subconditions based on the number of users with write permission are prepared, and the data characteristic classification unit 11 is thus made to perform file classification based on the number of users with write permission. For example, in the case of files shared by a large number of people and for which writing is permitted, there is a high possibility of file destruction occurring, and hence it can be judged that backup processing in a stable state with the emphasis on reliability is required. Therefore, the creator may set the number of common users and the presence or absence of write permissions as subconditions in the rule body, whereby file classification based on this aspect is performed by the processing of the data characteristic classification unit 11 (described in detail subsequently).

Further, when file classification with an emphasis on file (or directory) security is desired of the data characteristic classification unit 11, for example, a rule body can be created on the basis of at least one aspect of the following aspects (a) to (f), for example.

(a) Subconditions based on the presence or absence of encryption are prepared, and the data characteristic classification unit 11 is thus made to perform file classification based on the presence or absence of encryption. For example, a predetermined OS (one example of which is Microsoft's Windows2000 (trademark)) supports file encryption in the file system, and the presence or absence of this file encryption can be confirmed from a file attribute (metadata, for example). However, when encryption settings are in place, it is possible to judge that the file is data for which security must be secured. For this reason, the creator may establish the presence of encryption for the 'encryption presence or absence' as a subcondition in the rule body, and hence a data characteristic ID indicating that security is high is assigned to a file determined to be a high security file by the processing of the data characteristic classification unit 11 (described in detail subsequently).

(b) Subconditions based on the number of common users are prepared, and the data characteristic classification unit 11 is thus made to perform file classification based on the number of common users. For example, it can be judged that a file having a 'number of common users' equal to or less than a certain value is highly secret and file disclosure is restricted. For this reason, the creator may set the value of the 'number of common users' as a subcondition in the rule body and hence a data characteristic ID indicating that security is high is assigned to a file (or directory) for which the number of common users is equal to or more than a desired value by the processing of the data characteristic classification unit 11 (described in detail subsequently).

(c) Subconditions that are based on the presence or absence of ACL settings are prepared, and the data characteristic classification unit 11 is thus made to perform file classification based on the presence or absence of ACL settings. For example, a file with ACL setting can be judged as being data with access restrictions provided and for which security must be secured. For this reason, the creator may set the presence of ACL settings for 'presence or absence of ACL settings' as a subcondition in the rule body, and a data characteristic ID indicating that security is high is assigned to a file determined to be a high security file by the processing of the data characteristic classification unit 11 (described in detail subsequently).

(d) Subconditions based on the common user special characteristics (posts or departments, for example) are prepared and the data characteristic classification unit 11 is thus made to perform file classification based on the characteristics of common users. For example, it can be judged that a file that tends toward a characteristic according to which there is a large number of common users with a high position requires security to be secured. The creator may therefore set 'common user special characteristics' as a subcondition in the rule body and hence a data characteristic ID indicating that security is high is assigned to a file determined to be a high security file by the processing of the data characteristic classification unit 11 (described in detail subsequently).

(e) Subconditions based on a file name (or a directory name) are prepared and the data characteristic classification unit 11 is thus made to be perform file classification based on the file name (or directory name). For example, when a file that is known to require the securing of security exists, the creator may set the file name of this file (or the name of the directory with this file) as a subcondition in the rule body, and hence a data characteristic ID indicating that security is high is assigned to the file by the processing of the data characteristic classification unit 11 (described in detail subsequently).

(f) Subconditions based on a keyword contained in metadata or actual data are prepared, and the data characteristic classification unit 11 is thus made to perform file classification based on a keyword contained in metadata or actual data. For example, a file in which a keyword such as "(secret)" or "confidential" repeats itself in the metadata or actual data can be judged as one requiring security securing. In this case, the creator may set "(secret)" or "confidential" (or a number of keywords in addition to this word) as a "keyword" for the metadata or actual data as a subcondition in the rule body, and hence a data characteristic ID indicating that security is high is assigned to a file determined as a high security file by the processing of the data characteristic classification unit 11 (described in detail subsequently).

The data characteristic classification unit 11 assigns, on the basis of metadata (and/or actual data) of one or more designated backup target data files and the above-mentioned data characteristic classification definition information, one or more data characteristic IDs corresponding with one or more rule bodies satisfied by the file to the one or more backup target files (that is, performs classification of the backup target files). The data characteristic classification unit 11 then outputs data relating to the classification result, that is, for example, as illustrated in FIG. 4, classification result data D21 that is produced by associating information relating to the files (such as the file names, path names, and data sizes of the files, for example) with one or more data characteristic IDs assigned to these files, for each of the one or more backup target files. Further, as illustrated in FIG. 4, during file classification, when there is a file for which no condition of the rule body is satisfied, the data characteristic classification unit 11 assigns a predetermined code ('Default', for example), which indicates that such a condition is absent, to the file in place of data characteristic IDs or as one data characteristic ID. Furthermore, although not especially shown in FIG. 4, when a backup target file satisfying a plurality of conditions each indicated by a plurality of rule bodies exists, a plurality of data characteristic IDs are assigned to one backup target file.

Let us now refer to FIG. 2 once again. When the backup request unit 12 receives a backup request from outside (the operations manager, for example) with predetermined timing, the backup request unit 12 collates the classification result data D21 (see FIG. 4) output by the data characteristic classification unit 11, along with pre-prepared backup destination mapping information. Then, on the basis of the classification result data and the backup destination mapping information, the backup request unit 12 prepares, for each of the backup destination servers 6A to 6C, information relating to which backup target file is transmitted to which backup destination server, such as a backup list (described later), for example, and then transmits each backup list to the backup destination servers 6A to 6C to which these lists are addressed.

Here, as illustrated in FIG. 5, the backup destination mapping information includes information indicating which data characteristic ID (and the above-mentioned 'Default' indicating the absence thereof)—assigned file is backed up to which backup destination server, that is, information (a host (server) name, or IP address and so forth, for example) relating to one (or a plurality of) backup destination servers associated with a plurality of data characteristic IDs. This backup destination mapping information is created automatically by a computer or manually by a predetermined individual (an operations manager, for example), and is pre-stored in a predetermined location on a communication network (in the backup source server 3 or backup source storage device 4, for example).

Figure 6:
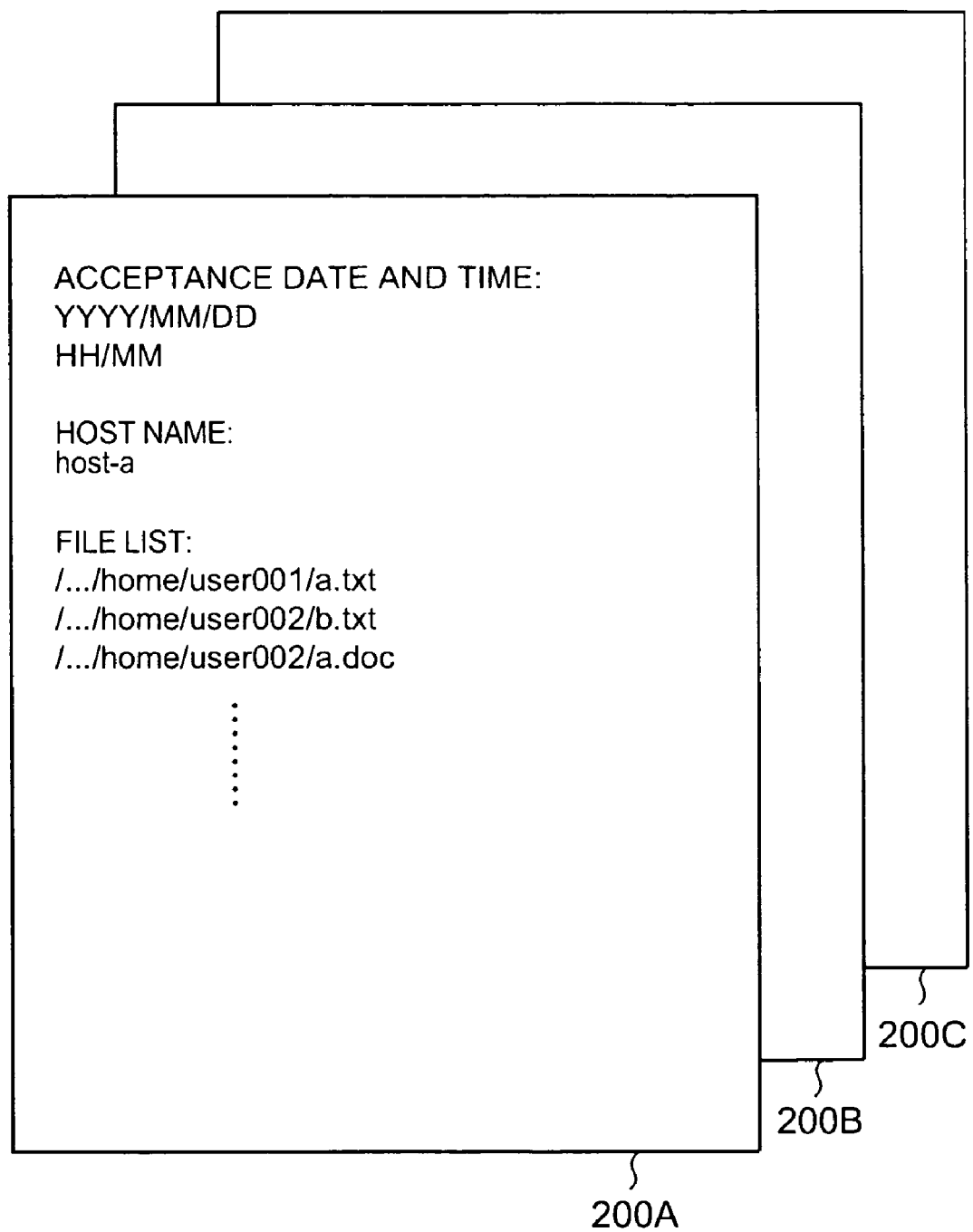
FIG. 6 shows an example of backup lists 200A, 200B, and 200C.

Furthermore, the backup lists are prepared in the same quantity as the backup destination servers. For example, the three backup lists 200A, 200B, and 200C illustrated in FIG. 6 are prepared for three backup destination servers 6A, 6B, and 6C by the backup request unit 12. If this is described representatively with respect to the backup list 200A, the 'acceptance date and time' and information relating to the backup destination server corresponding with this list 200A (the 'host name' and 'file list' as shown, for example) are recorded in the backup list 200A.

The 'acceptance date and time' is information indicating the date and time (or permitted time slot) when the backup destination server 6A is granted access to the backup source server 3, and is expressed in predetermined units (year/month/day/hour/minutes/seconds, for example). The acceptance date and time is allocated automatically by the backup request unit 12, for example, but may be established manually by a predetermined user (operations manager, for example). The backup request unit 12 is able to avoid a concentration of the load resulting from the backup processing on the backup destination servers 6A to 6C by varying the respective acceptance date and time of the backup lists 200A to 200C at fixed time intervals (a time interval that is presumed necessary in order for the backup destination servers 6A to 6C to acquire one or more predetermined backup target files from the backup source server 3, for example). Further, the time required in order to acquire one or more predetermined backup target files can be estimated from the total of the data size of the backup target files, for example.

The 'host name' is information indicating the name of the backup destination server 6A.

The 'file list' expresses information relating to one or more backup target files classified as backed up to the backup destination server 6A (the file name, path name, data size, and so forth, of each file, for example) in list format.

The other backup lists 200B and 200C are substantially the same as the backup list 200A. The backup request unit 12 creates the backup lists 200A to 200C based on the flow described below.

Figure 7:
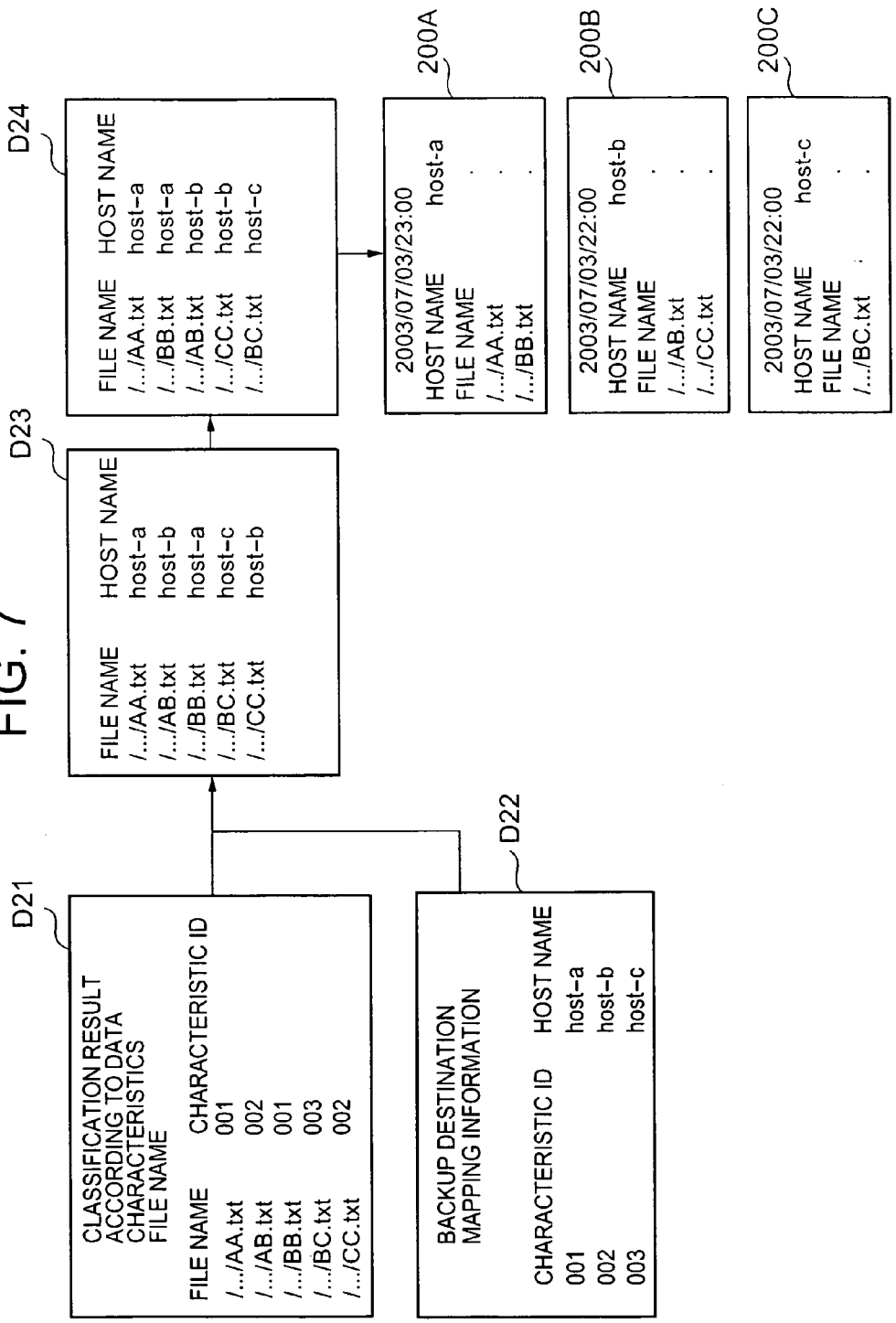
FIG. 7 is an image diagram of the flow of the processing of a backup request unit 12.

FIG. 7 is an image diagram of the flow of the processing of the backup request unit 12.

As shown in FIG. 7, the backup request unit 12 collates the classification result data D21 that is output by the data characteristic classification unit 11, and pre-prepared backup destination mapping information D22, and thus obtains data D23 that is produced by converting a data characteristic ID in the classification result data D21 into a backup destination host name (backup destination server name). Next, the backup request unit 12 sorts sets of file names and host names recorded in this data D23 by the host names, and thus converts the data D23 into data D24 in which the sets of file names and host names recorded in this data D23 are sorted by the host names. The backup request unit 12 then divides up and outputs this data D24 into files for each host name, and creates the backup lists 200A to 200C corresponding to the backup destination servers 6A to 6C respectively by adding the above-mentioned acceptance date and time to each output file (further, the backup lists 200A to 200C may be divided into even smaller files, in which case the acceptance date and time is added to each further divided file).

The backup request unit 12 transmits the backup lists 200A to 200C so created to the corresponding backup destination servers 6A to 6C. Accordingly, the backup destination servers 6A to 6C assign discrimination information (hereinafter 'backup discrimination information') to the received backup lists 200A to 200C and transmit this backup discrimination information to the backup source server 3. The backup source server 3 receives backup discrimination information from each of the backup destination servers 6A to 6C and the backup request unit 12 creates restore information for recovering backup target files on the basis of the backup discrimination information (the restore information as well as the restoration processing that employs this information will be described in detail subsequently).

Upon receiving a download request (described subsequently) from the backup destination servers 6A to 6C, the backup request unit 12 stores the transmitted backup lists 200A to 200C in predetermined storage regions (predetermined storage regions in the backup source server 3 or backup source storage device 4, for example) in order to perform a validity check on the date and time a request is received and to back up one or more predetermined backup target files in the backup destination servers 6A to 6C constituting the request source.

Let us refer to FIG. 2 once again. The download acceptance unit 13 accepts backup target file download (transfer) requests from the backup destination servers 6A to 6C, and, in the event of a request, checks whether the date and time when the request was received are valid. More specifically, in a case where the download acceptance unit 13 receives a download request from the backup destination server 6A, for example, the download acceptance unit 13 judges whether there is a complete or substantial match between this date and time and a date and time that is designated in advance by the backup source server 3 with respect to the backup destination server 6A (that is, the acceptance date and time written in the backup list 200A that is output by the backup request unit 12). In the event of such a match, the download acceptance unit 13 reads one or more backup target files that have one or more file names written in the backup file 200A from a predetermined location (the backup source storage device 4, for example), and transmits these backup target files to the backup destination server 6A that is the source of the download request. On the other hand, if no such match exists, the download acceptance unit 13 performs predetermined processing, i.e. communicates an error to the backup destination server 6A, for example. Further, the above-mentioned 'substantial match' means that the difference between the current date and time when the download request is received and the acceptance date and time lies within a predetermined error range, for example, and this predetermined error range may be common to all the backup lists or vary from one backup list to the next. In addition, the predetermined error range may be varied by a predetermined user or may be fixed so as to be unchangeable. Further, the predetermined error range may be stored in a predetermined storage device separately from the backup list or may be described in the backup list.

The restore unit 14 restores a backup target file on the basis of the restore information created by the backup request unit 12 (described in detail subsequently with respect to the restore processing).

Each application with which the backup source server 3 is equipped was described above. Next, the backup destination server 6A will be described representatively for the backup destination servers 6A to 6C with reference to FIG. 2 (further, although the backup destination server 6A is illustrated representatively in FIG. 2, the other backup destination servers 6B and 6C are also able to communicate with the backup source server 3).

The backup destination server 6A comprises an operating system (OS) 20 and the backup request acceptance unit 21 as application software above this OS.

The backup request acceptance unit 21 receives the backup list 200A from the backup source server 3 and stores this list in a predetermined storage region (a predetermined storage region in the backup destination server 6A or backup destination storage device 5A, for example). The backup request acceptance unit 21 then generates backup discrimination information for this backup on the basis of the backup list 200, and stores this information in a predetermined storage region. Then, after running a process to perform backup processing, the backup request acceptance unit 21 transmits the stored backup discrimination information to the backup source server 3. Incidentally, the backup process is in a standby state until the current date and time reaches the acceptance date and time listed in the received and stored backup list 200A (until the current date and time falls within the range of a time slot when the acceptance date and time is expressed by this time slot). When the current date and time reaches the acceptance date and time of the backup list 200A, the backup request acceptance unit 21 runs a backup process, issues a download (transfer) request to the download acceptance unit 13 of the backup source server 3, and creates an archive file that has the stored backup discrimination information.

Figure 8:
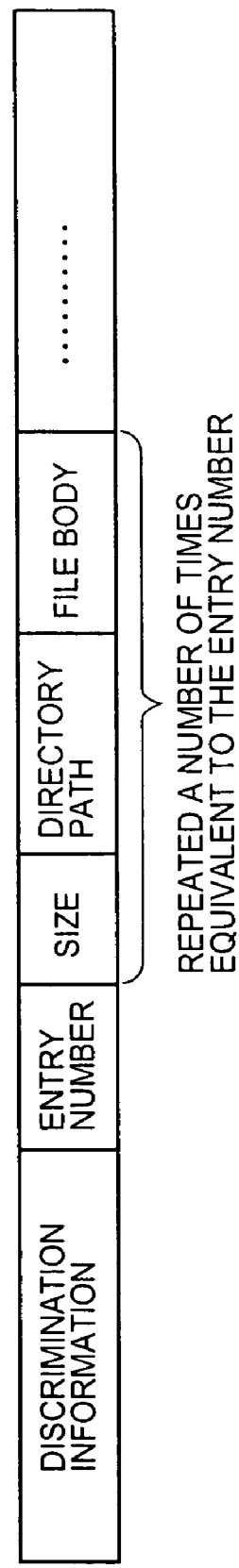
FIG. 8 shows the constitution of an archive file created by a backup request acceptance unit 21.

FIG. 8 shows the constitution of an archive file created by the backup request acceptance unit 21.

For example, as is shown, stored in the archive file for the backup list 200A are: backup discrimination information generated for the backup list 200A, the entry number of backup target files (that is, the number of backup target files stored in the archive file), and backup target information in an amount corresponding to the entry number (such as the data size, path within the backup source server 3, and body (file itself), of each file, for example).

When the backup request acceptance unit 21 shown in FIG. 2 downloads one or more backup target files recorded in the backup list 200A from the backup source server 3 in response to the download request, the backup request acceptance unit 21 stores these backup target files in the archive file. Once the processing to store the backup target files in the archive file is complete, the backup request acceptance unit 21 stores the archive file containing the backup target files in the backup destination storage device 5A.

The flow of the processing of each application above will now be described below by using a flowchart.

Figure 9:
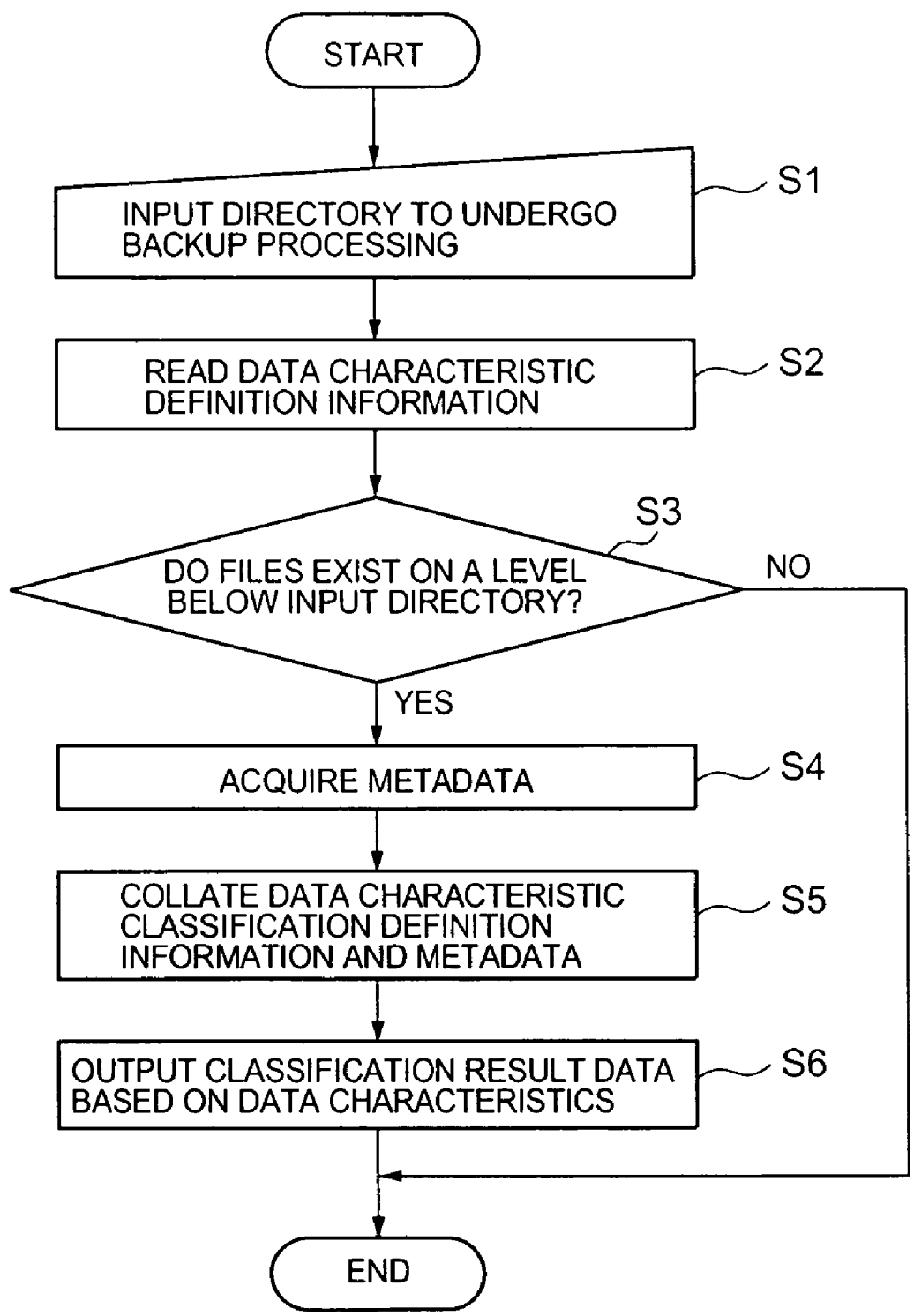
FIG. 9 is a flowchart showing the flow of the processing of a data characteristic classification unit 11 that a backup source server 3 comprises.

FIG. 9 is a flowchart showing the flow of the processing of the data characteristic classification unit 11 that the backup source server 3 comprises.

A predetermined user (operations manager, for example) inputs a backup target directory (or a directory with the backup target file, for example) to the backup source server 3 (step S1). Further, the data characteristic classification unit 11 reads (S2) the data characteristic classification definition information (see FIG. 3) that has been preset and stored.

Next, the data characteristic classification unit 11 searches for directories and files contained in the directory that is input in S1 (that is, on a level below the directory), and, if the sought directories and files are present (YES in S3), acquires metadata for all these files and directories (and/or actual data) (S4).

Next, the data characteristic classification unit 11 collates (S5) metadata (and/or actual data) for the files (and directories) acquired in S4 and data characteristic classification definition information read in S2, performs classification based on the data characteristics of the backup target files by capturing the data characteristic IDs corresponding to the backup target files and then associating these data characteristic IDs with the files, and outputs (S6) the classification result data representing the classification results (see FIG. 4), and stores this data in a predetermined storage region. For example, the data characteristic classification unit 11 may read a plurality of files in the directory that was input in S1 one by one, and then repeatedly execute S4 to S6. That is, the data characteristic classification unit 11 performs S4 to S6 by reading out a certain single file from the plurality of files in the directory input in S1, and then performs S4 to S6 by reading out another single file, and may repeat this processing until it is complete for all these plural files.

Further, as a result of such classification processing, the one or more backup target files retrieved in S3 are classified according to a predetermined standard, such as at least one standard among (A) to (C) and (a) to (f) mentioned earlier, for example, based on the file data characteristics. That is, one or more characteristic ID data items is (are) assigned to each backup target file on the basis of at least one item among: the number of common users of the file, special features common to the common users, an extension, a keyword, and the presence or absence of access restriction information such as an ACL, and the presence or absence of encryption, for example.

Further, in this classification processing, depending on the content of metadata (or actual data) of a backup target file (and/or directory), a plurality of conditions expressed by a rule body are sometimes satisfied, in which case a plurality of data characteristic IDs are assigned to one backup target file. Further, in a case where, in the mapping information, two or more server information items (host names, for example) correspond with one data characteristic ID, one backup target file is backed up to two or more servers.

When the backup target is designated, the serial flow above can also be performed with predetermined timing, such as immediately after the designation, for example, or can be performed at fixed or irregular intervals after the designation. In the latter case, for example, if the user designates a pre-prepared desired directory as the backup target and stores a file in this desired directory, the classification of the file stored in the desired directory is performed automatically at fixed intervals or with other predetermined timing.

Figure 10:
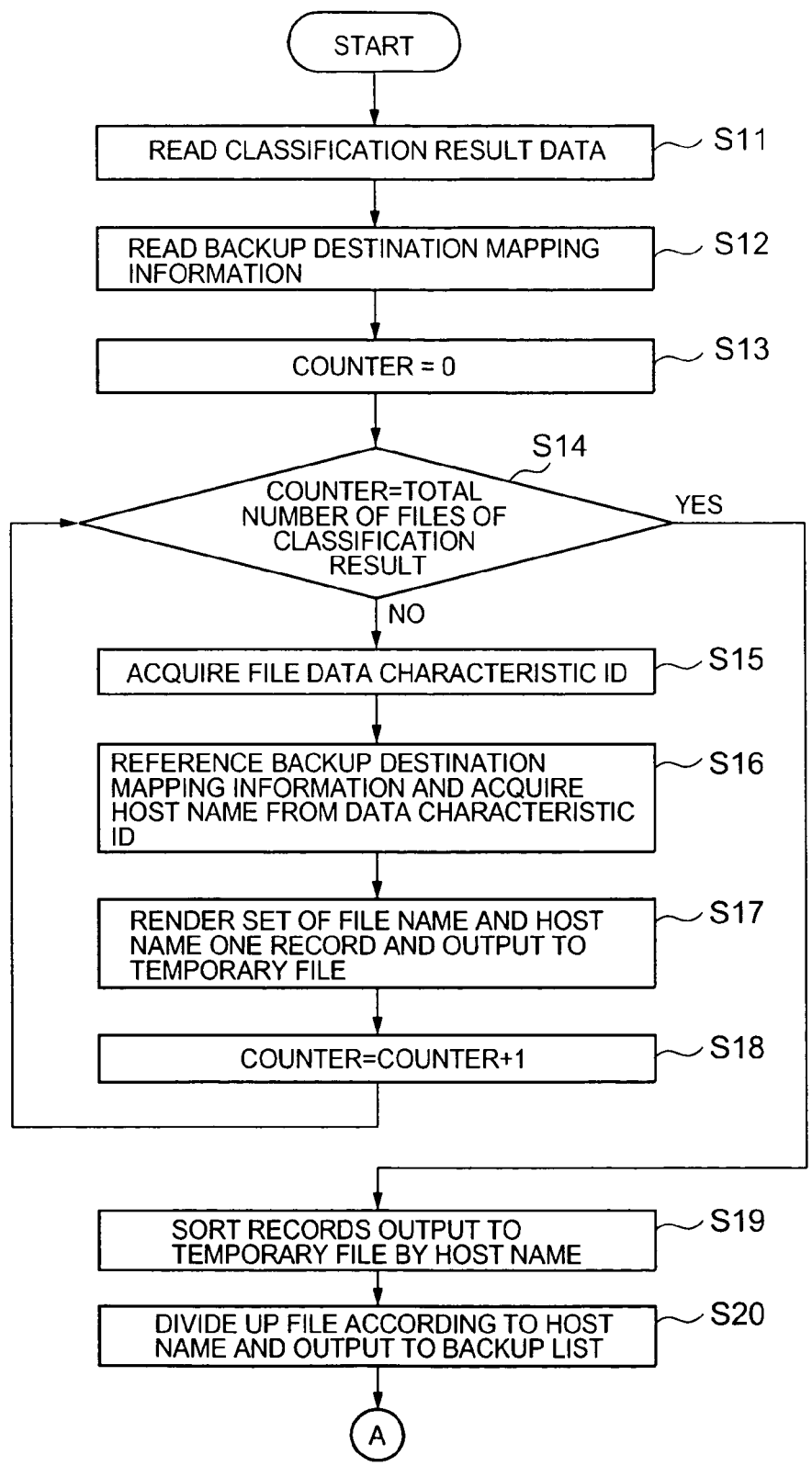
FIG. 10 is a flowchart showing the flow of the processing of the backup request unit 12.
Figure 11:
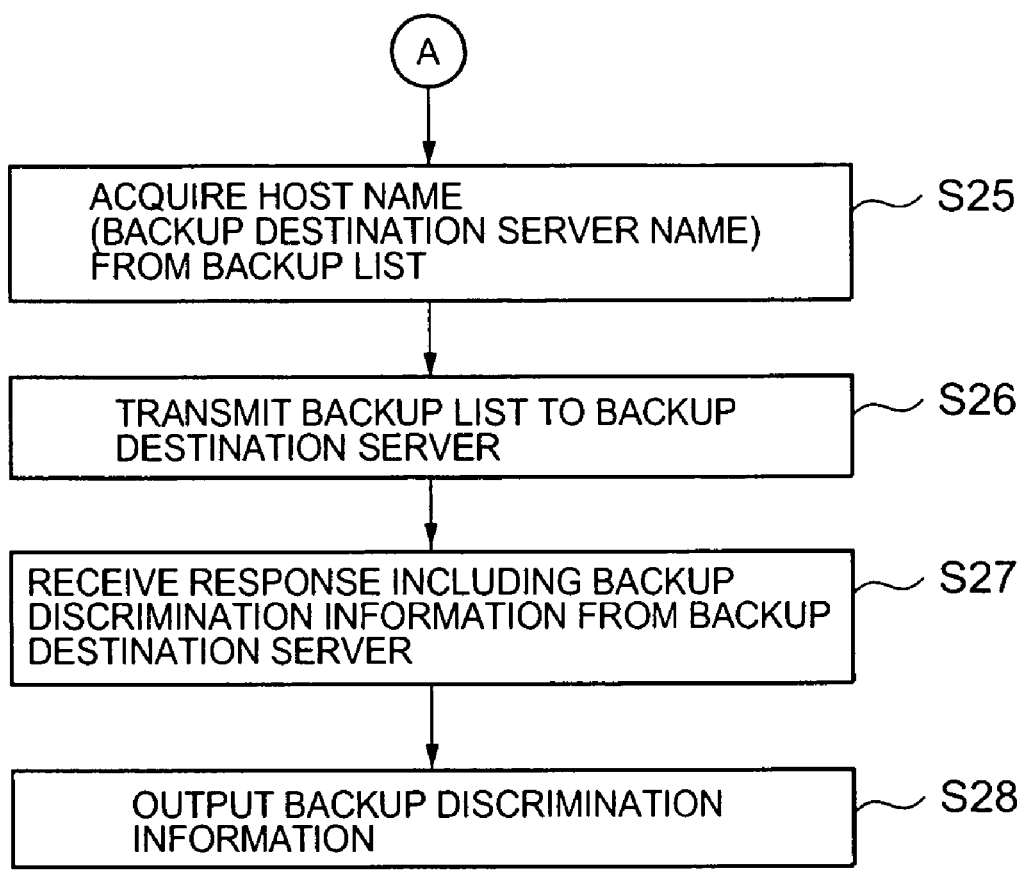
FIG. 11 is a flowchart showing the flow of the processing of the backup request unit 12.

FIGS. 10 and 11 are flowcharts showing the flow of the processing of the backup request unit 12.

When the backup request unit 12 receives a backup request from outside (the operations manager, for example), for example, with predetermined timing, the classification result data that is output by the data characteristic classification unit 11 is read from a predetermined storage region (S11) as shown in FIG. 10.

Next, the backup request unit 12 reads the pre-prepared backup destination mapping information (S12).

The backup request unit 12 then sets the counter value at '0' (S13), and compares this value with the number of files recorded in the classification result data (S 14). The backup request unit 12 performs the processing of (S15) to (S18) below until the counter value equals the number of files of the backup target files recorded in the classification result data (NO in S14).

(S15) The backup request unit 12 acquires the data characteristic ID corresponding with the file name (or path name) of the target recorded in the classification result data.

(S16) The backup request unit 12 references the backup destination mapping information to acquire the host name corresponding with the data characteristic ID acquired in S15.

(S17) The backup request unit 12 associates the host name acquired in S16 with the file name of the target in S15, renders a set of the file name and the host name one record, and outputs same to a predetermined temporary file (the data file D23 shown in FIG. 8, for example).

(S18) The backup request unit 12 increments the counter value by one.

Once the counter value reaches the file number recorded in the classification in result data as a result of the above processing of (S15) to (S18) (YES in S14), the backup request unit 12 sorts the one or more records recorded in the temporary file by the host names (S19).

Next, on the basis of the host name, the backup request unit 12 divides up the temporary file whose records have been sorted by the host name. That is, the backup request unit 12 performs division to produce the same number of files as the types of host names (that is, the backup destination servers 6A to 6C) recorded in the temporary file, and creates and outputs (S20) the backup lists 200A to 200C corresponding with the backup destination servers 6A to 6C by recording the acceptance date and time in the files obtained by this division.

Next, as shown in FIG. 11, the backup request unit 12 performs the following processing on all the backup lists 200A to 200C.

That is, first of all, the backup request unit 12 captures (S25) the backup destination servers 6A to 6C by acquiring the host names (backup destination server names) from the backup lists 200A to 200C.

The backup request unit 12 then transmits (S26) each of the backup lists 200A to 200C to the backup destination servers 6A to 6C thus captured in S25. The backup request unit 12 also stores these backup lists 200A to 200C in a predetermined storage region.

Thereafter, the backup request unit 12 receives (S27) a response that includes the above-mentioned backup discrimination information from the backup destination servers 6A to 6C. The backup request unit 12 then renders the backup discrimination information included in the response and information (host name, for example) relating to the backup destination server constituting the information transmission source a set, and outputs this set (S28) to a predetermined file (for example, a restore file described subsequently).

Figure 12:
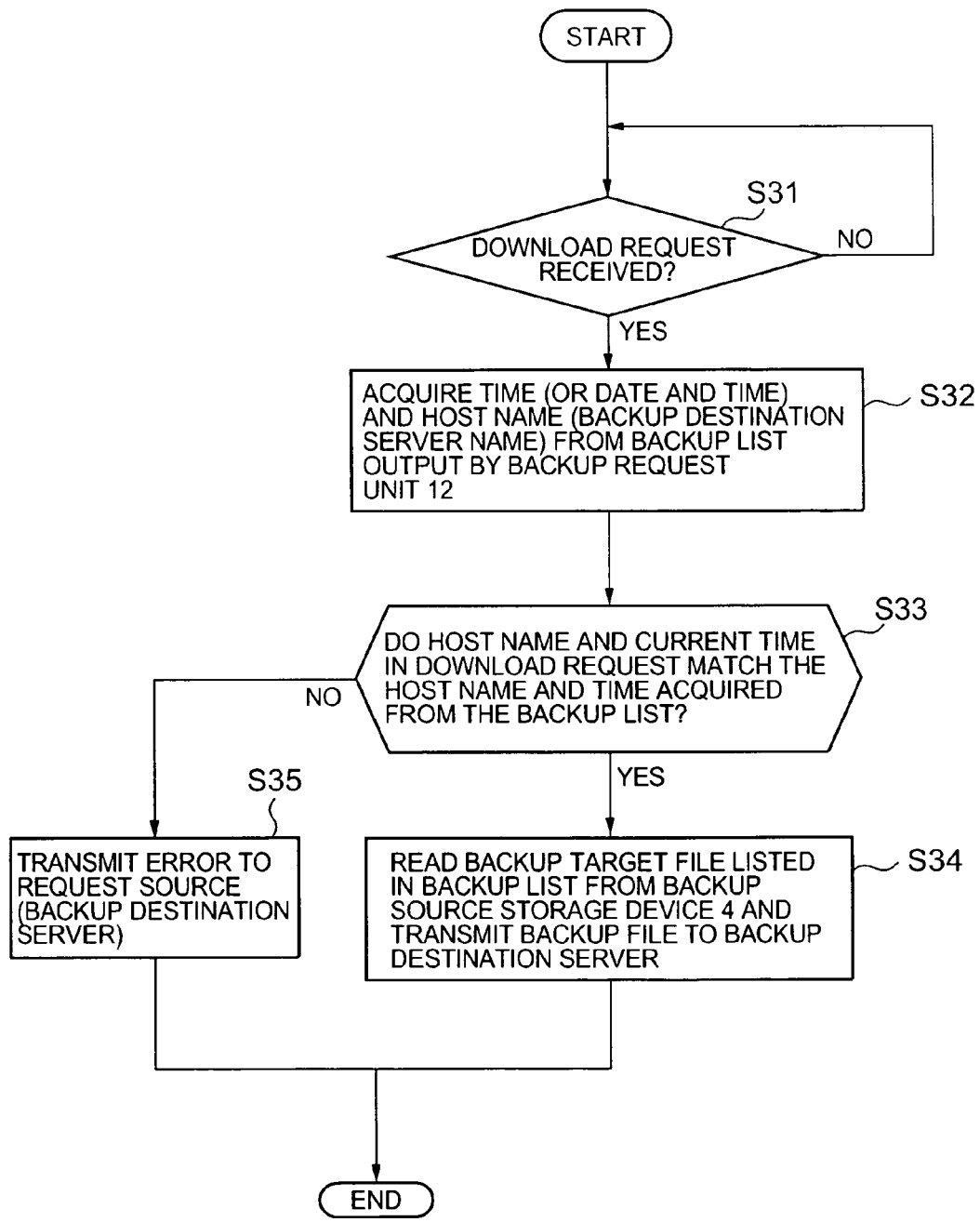
FIG. 12 is a flowchart showing the flow of the processing of a download acceptance unit 13.

FIG. 12 is a flowchart showing the flow of the processing of the download acceptance unit 13.

When the download acceptance unit 13 receives (YES in S31) a download request including the host name of the server 6A from the backup destination server 6A, for example, the download acceptance unit 13 acquires (S32) the acceptance date and time and the host name from all the file lists 200A to 200C output by the backup request unit 12.

The download acceptance unit 13 compares the host name and the current date and time included in the download request received in S31 with the host name and acceptance date and time acquired in S32, and thus judges whether a match exists (S33).

When such a match exists (YES in S33) as a result of the judgment in S23, the download acceptance unit 13 reads out one or more backup target files each having one or file names listed in the backup list 200A from the backup source storage device 4 and transmits (S34) the one or more backup target files thus read to the backup destination server 6A that is the transmission source of the download request.

When, on the other hand, no such match exists as a result of S23, the download acceptance unit 13 transmits an error to the backup destination server 6A (S35).

Figure 13:
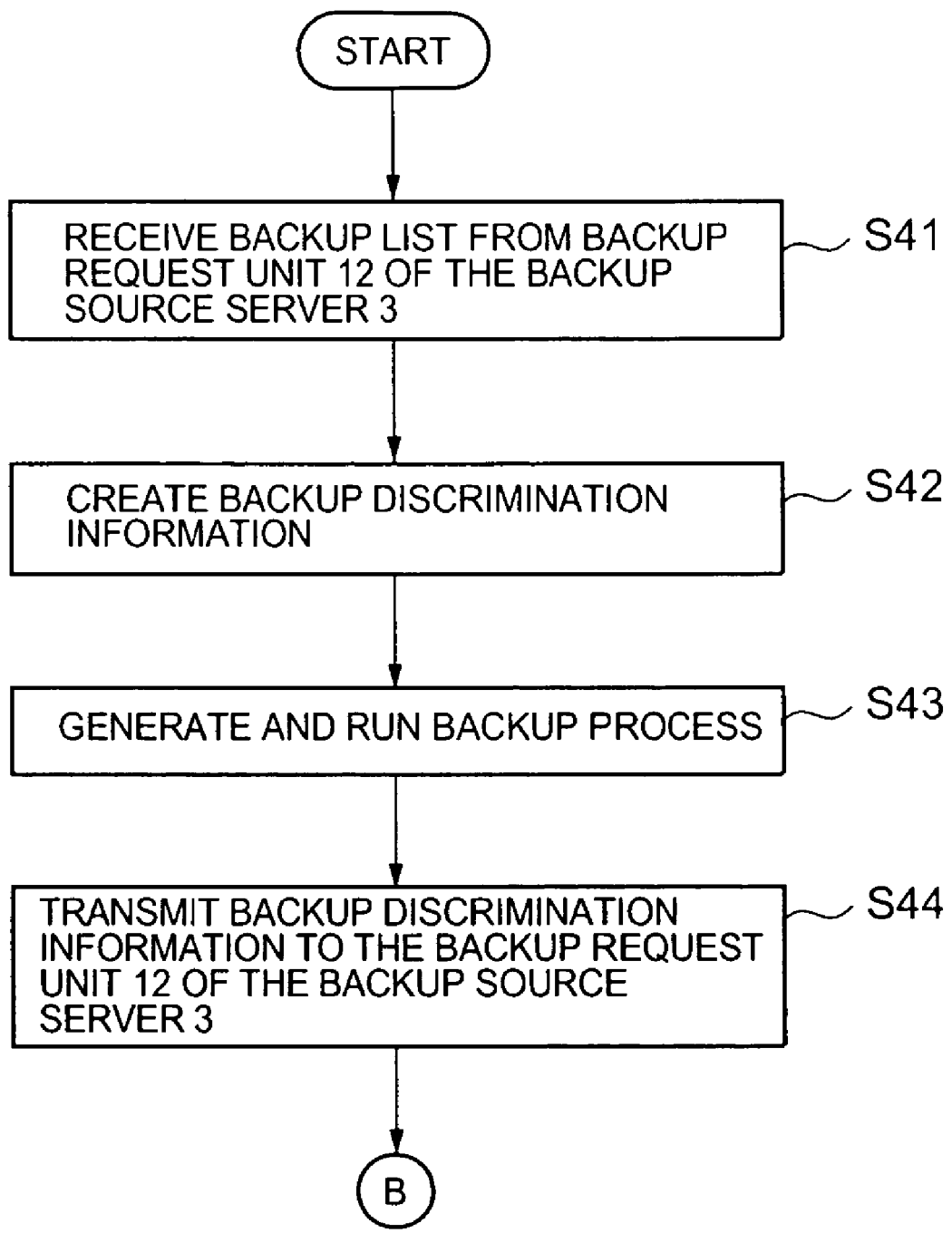
FIG. 13 shows the flow of the processing of the backup request acceptance unit 21 of the backup destination server.
Figure 14:
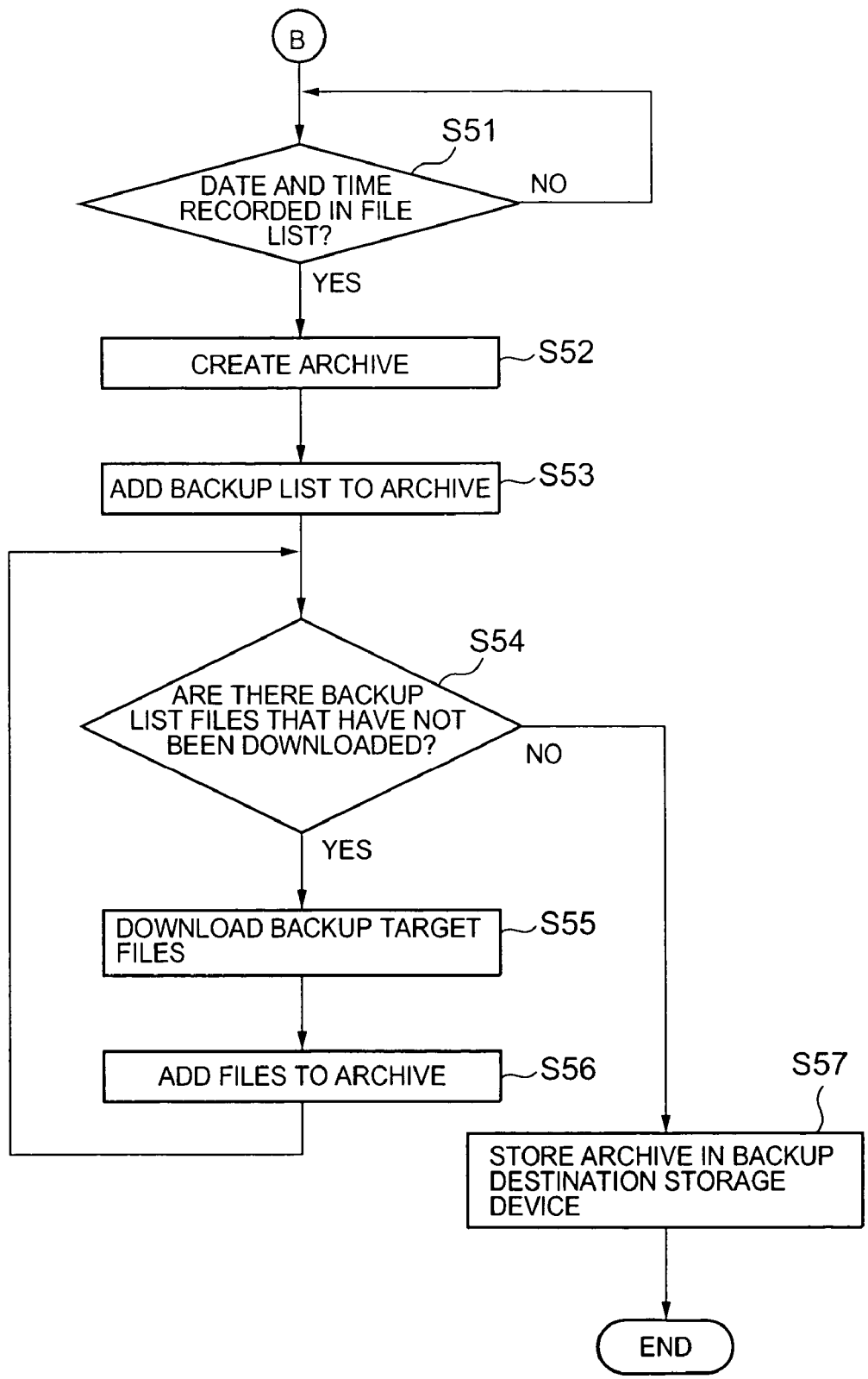
FIG. 14 shows the flow of the processing of the backup request acceptance unit 21 of the backup destination server.

FIGS. 13 and 14 show the flow of the processing of the backup request acceptance unit 21 of the backup destination server. The backup destination server is described below as the backup destination server 6A.

As shown in FIG. 13, the backup request acceptance unit 21 of the backup destination server 6A receives (S41) the backup list 200A from the backup request unit 12 of the backup source server 3 and stores the backup list 200A in a predetermined storage region.

Next, the backup request acceptance unit 21 creates backup discrimination information relating to the backup list 200A (S42).

The backup request acceptance unit 21 then generates and runs the backup process (S43).

Thereafter, the backup request acceptance unit 21 transmits (S44) the backup discrimination information thus created in S42 to the backup request unit 12 of the backup source server 3.

Thereafter, as shown in FIG. 14, when it is detected that the current date and time has reached the acceptance date and time listed in the backup list 200A (YES in S51), the backup request acceptance unit 21 creates (S52) an archive file (see FIG. 8) with the backup discrimination information created in S42 by means of the backup process run in S43.

Next, the backup request acceptance unit 21 records (S53) information relating to the backup lists 200 in the archive file. For example, based on the backup lists 200, the backup request acceptance unit 21 registers the number of file names recorded in the backup list 200A as the entry number in the created archive file and registers the path (path within the backup source server 3) of each file.

Next, the backup request acceptance unit 21 receives (YES in S54, and S55) one or more backup target files each having one or more file names written in the backup list 200A from the backup source server 3 and stores the received backup target files in the archive file (S56).

Once the backup request acceptance unit 21 has downloaded all the backup target files and stored these files in an archive file (NO in S54), the archive file is stored in the backup destination storage device 5A (S57).

According to the embodiment above, data characteristic classification definition information in which one or a plurality of data characteristic IDs correspond with one or more data characteristic types, and mapping information in which one, or two or more backup destination server information items (server names, for example) correspond with one or a plurality of data characteristic IDs are prepared. Upon receiving a backup target designation, the backup source server 3 sets metadata (and/or actual data) for the designated files (and/or directories) with predetermined timing, and, based on the above data characteristic classification definition information, sets data characteristic IDs (that is, data characteristic types) for the backup target files, and, based on the set data characteristic IDs and mapping information, determines the backup destination servers 6A to 6C of the backup target files, before transmitting the backup target files to the servers 6A to 6C so determined. Accordingly, even if the data characteristic classification definition information and mapping information (or, instead, information in which one, or two or more backup destination server information items correspond with one or more data characteristic types) are prepared, the designated backup target is automatically backed up to the backup destination matching the data characteristic type of the backup target on the basis of the data characteristics of the backup target. That is, backup processing, which is suited to the data characteristics relating to the backup target, is performed by means of a method that is simple for the user.

Further, according to the above embodiment, when there is no match between the current date and time when the download request is received from a certain backup destination server 6A and the acceptance date and time allocated to the backup list 200A of the server 6A, that is, even when a download request is received at a date and time other than the predetermined acceptance date and time, the backup source server 3 does not perform a backup of the backup target file. Accordingly, unauthorized downloading of the backup target file can be prevented before it takes place, whereby the security of the backup target file can be raised.

Therefore, according to the embodiment above, the backup discrimination information that the backup destination servers 6A to 6C create upon receiving the backup lists 200A to 200C is used by the backup source server 3 in order to recover the backup target files written in the backup lists 200A to 200C. The backup discrimination information corresponding with the backup lists 200A to 200C may be any information as long as the backup source server 3 is able to obtain the backup target files written in the corresponding backup list from the backup destination servers 6A to 6C. For example, the backup discrimination information can be information including at least one of the backup destination server name, the name of the backed up backup target file, and the data size. In such a case, the backup source server 3 can inform any backup destination server which file is to be stored by managing such information.

When backup discrimination information is received from the backup destination servers 6A to 6C, the backup source server 3 associates and records backup discrimination information corresponding with each of the servers 6A to 6C with information relating to a plurality of backup destination servers 6A to 6C (host name, for example) in a predetermined restore file D30 shown in FIG. 15, for example.

Then the backup source server 3 restores the backup target file to the backup source storage device 4 as follows by using the restore file D30.

FIG. 16 shows the flow of the restore processing of the backup source server 3.

The backup source server 3 performs the processing of (S61) to (S65) below with respect to all the servers 6A to 6C each having all the host names recorded in the restore file D30. This processing is described representatively for server 6A below.

(S61) The backup source server 3 connects to the backup destination server 6A.

(S62) The backup source server 3 reads the backup discrimination information for the server 6A constituting the connection destination from the restore file D30, sets the storage destination directory for the backup target file to be subsequently acquired from the backup destination server 6A in the backup source storage device 5, and acquires the path of this directory.

(S63) The backup source server 3 communicates the read backup discrimination information to the backup destination server 6A and, based on this backup discrimination information, specifies the archive file that stores the backup target file constituting the recovery target to the server 6 and acquires the backup target file from the specified archive file, whereby the acquired backup target file is received from the backup destination server 6A.

(S64) Based on the path acquired in S62, the backup source server 3 stores the backup target file received from the backup destination server 6A in the directory set in S62.

(S65) The backup source server 3 breaks the connection with the backup destination server 6A.

As a result of the above processing, the backup source server 3 is able to restore one or more backup target files, which have been backed up in the backup destination servers 6A to 6C respectively, to the backup source storage devices 5.

A preferred embodiment of the present invention has been described above but this embodiment is an example serving to illustrate the present invention and is not intended to restrict the scope of the present invention to this embodiment alone. The present invention can also be implemented in a variety of other forms.

For example, the backup request unit 12 is able to avoid a concentration of the load resulting from the backup processing on the backup destination servers 6A to 6C by varying the respective acceptance date and time of the backup lists 200A to 200C at fixed time intervals (a time interval that is presumed necessary in order for the backup destination servers 6A to 6C to acquire one or more predetermined backup target files from the backup source server 3, for example). This acceptance date and time may be established manually by the individual requesting the backup or may be established automatically by the backup source server 3. When the acceptance date and time are established automatically, the backup source server 3 is able to capture the total data size of one or more backed up backup target files for each of the backup destination servers 6A to 6C, estimate the time required for the backup on the basis of the data size, and schedule the acceptance date and time on the basis of the estimated time, for example (the acceptance date and time may be set in the order of the estimated backup time starting with the shortest or longest time first, for example).

In addition, for example, the backup destination servers 6A to 6C may issue a download request immediately after receiving a backup list from the backup source server 3. In this case, the acceptance date and time need not be written in the backup list, for example. Alternatively, when a download request is issued, the download request may be issued once again at the acceptance date and time listed in the backup list only when the communication traffic is congested. Further, in this case, for example, the backup source server 3 may transmit all the backup lists 200A to 200C to the backup destination servers 6A to 6C at the same time, or may schedule the timing for transmitting the backup lists 200A to 200C and perform transmission at another time. When a backup destination server requests a download immediately after receiving a backup list, the concentration of the load on the backup source server 3 or network can be avoided by adjusting the timing for transmitting the backup lists 200A to 200C. Further, the timing for transmitting the backup lists may be scheduled on the basis of an estimated time by capturing the total data size of one or more backup target files for each of the backup destination servers 6A to 6C, for example, and estimating the time required for a backup on the basis of this data size (the transmission timing may be brought forward for a shorter or longer estimated backup time, for example).

What is claimed is:

1. A backup system, comprising:
   a backup source computer device that stores backup target data;
   a plurality of backup destination computer devices each connected to the backup source computer device via a network;
   a backup mode selector that selects, according to data characteristics of the backup target data, any one backup mode from among a plurality of pre-prepared backup modes; and
   a backup executor that stores the backup target data by transferring the backup target data from the backup source computer device to a backup destination computer device that is selected on the basis of the selected backup mode from among the backup destination computer devices,
   wherein the backup executor selects a backup destination computer device constituting a backup destination on the basis of backup destination mapping information constituted so as to pre-match at least one or more backup destination computer devices of the backup destination computer devices with each backup mode.

2. The backup system according to claim 1, wherein the backup mode selector determines whether the backup target data possesses any data characteristic on the basis of pre-prepared characteristic classification conditions.

3. The backup system according to claim 2, wherein the backup mode selector determines whether the backup target data possesses any data characteristics by comparing acquired metadata relating to the backup target data, and the characteristic classification conditions.

4. The backup system according to claim 1, wherein data characteristics include any one of data characteristics that prioritize the securing of data reliability or data characteristics that prioritize the securing of data security.

5. The backup system according to claim 4, wherein the data characteristics that prioritize the securing of data reliability can be determined on the basis of at least one or more of judgment elements comprising the number of common users, file extension type, file name, and the presence or absence of write permissions; and
   the data characteristics that prioritize the securing of data security can be determined on the basis of at least one or more of judgment elements comprising the presence or absence of encryption, the number of common users, special features common to common users, the presence or absence of access restrictions, file extension type, file name, and the presence or absence of predetermined keywords.

6. The backup system according to claim 1, wherein the backup executor comprises:

a backup list generator that generates a backup list that includes information specifying backup target data to be acquired by the backup destination computer device; and
   a backup list transmitter that transmits the backup list to the backup destination computer device, and
   wherein the backup destination computer device comprises:
   a data acquisitor that stores backup target data by acquiring same from the backup source computer device on the basis of the backup list received from the backup source computer device.

7. The backup system according to claim 6, wherein the backup list includes information indicating a backup availability time when backup target data can be acquired from the backup source computer device, and the backup destination computer device accesses the backup source computer device according to the backup availability time to acquire the backup target data.

8. The backup system according to claim 6, wherein, upon receiving the backup list from the backup source computer device, the backup destination computer device generates restore data to be used for restoring the backup target data, and transmits the restore data thus generated to the backup source computer device.

9. The backup system according to claim 6, wherein the backup list transmitter controls the time for transmitting the backup list to the backup destination computer device.

10. A backup method that performs a backup between a backup source computer device for storing backup target data and a plurality of backup destination computer devices each connected to the backup source computer device via a network, the backup method comprising:
    determining data characteristics pertaining to backup target data on the basis of characteristic classification conditions for classifying data characteristics;
    selecting a backup mode by determining a backup destination computer device for each of the backup target data on the basis of the determined data characteristics and of backup destination mapping information that is constituted so that at least one or more of the backup destination computer devices constituting backup destinations correspond(s) with each of the data characteristics;
    collecting, for each of the backup destination computer devices, the backup target data corresponding with the backup destination computer devices;
    generating, for each of the backup destination computer devices, a backup list that includes information specifying backup target data to be acquired by the backup destination computer devices;
    transmitting the generated backup lists to the backup destination computer devices; and
    transmitting the backup target data from the backup source computer device to the backup destination computer devices on the basis of the received backup lists.

11. A computer device, comprising:
    a component that stores characteristic classification conditions for classifying data characteristics;
    a component that determines data characteristics pertaining to backup target data on the basis of the characteristic classification conditions;
    a component that stores backup destination mapping information constituted such that at least one or more backup destination computer devices constituting a backup destination correspond(s) with each of the data characteristics;

a component that selects a backup mode by determining a backup destination computer device for each of the backup target data on the basis of the determined data characteristics and the backup destination mapping information;

a component that collects, for each of the backup destination computer devices, the backup target data corresponding with the backup destination computer devices and generating, for each of the backup destination computer devices, a backup list including information specifying backup target data to be acquired by the backup destination computer devices;

a component that transmits the generated backup lists to the backup destination computer devices; and a component that transfers the backup target data to the backup destination computer devices when the backup destination computer devices request the acquisition of backup target data on the basis of the transmitted backup lists.

* * * * *